US006241119B1

(12) United States Patent
Stephenson

(10) Patent No.: US 6,241,119 B1
(45) Date of Patent: Jun. 5, 2001

(54) VENDING MACHINE

(75) Inventor: Paul Stephenson, Huddersfield (GB)

(73) Assignee: U-Select-It (GB)

( * ) Notice: Subject to any disclaimer, the term of this patent is extended or adjusted under 35 U.S.C. 154(b) by 0 days.

(21) Appl. No.: 09/198,836

(22) Filed: Nov. 24, 1998

(30) Foreign Application Priority Data

Nov. 25, 1997 (GB) .................................................. 97 24753

(51) Int. Cl.[7] ...................................................... B65G 59/00
(52) U.S. Cl. ............................................ 221/120; 221/277
(58) Field of Search ................................. 221/70, 69, 76, 221/92, 119, 120, 132, 277

(56) References Cited

FOREIGN PATENT DOCUMENTS

2247056 * 10/1973 (FR) .
2 104050 3/1983 (GB) .............................. G07F/11/52
2 178 733 2/1987 (GB) .............................. G07F/11/52
WO 95/15541 * 6/1995 (WO) .
95/15541 6/1995 (WO) ............................. G07F/11/00

* cited by examiner

*Primary Examiner*—Kenneth W. Noland
(74) *Attorney, Agent, or Firm*—Jenkins & Wilson, P.A.

(57) ABSTRACT

A vending machine comprising a base (10) and a transparent lid (20) housing one or more wheel assemblies (30*a–g*). The lid (20) is provided with an access door (21) at a convenient height for a user and the wheels (30*a–g*) are independently rotatable in a user selection process to view products such as food displayed thereon. The access door (21) is releasable in response to a payment mechanism (13). Conveniently, many food products can be viewed independently, and multiple users can each independently control one of the plurality of display wheels (30*a–g*) giving improved user satisfaction and throughput.

16 Claims, 4 Drawing Sheets

VENDING MACHINE

BACKGROUND OF THE INVENTION

1. Field of the Invention

The present invention relates in general to the field of vending machines, and in particular but not exclusively to a vending machine for food products.

2. Description of the Prior Art

Food vending machines allow the vending of food products at the convenience of the user in a self-service environment. A particular example is the vending of snacks and light meals to be eaten cold or to be heated in a nearby microwave oven facility. Most commonly, prior art vending machines comprises a refrigerated display area having a carousel mounted for rotation about a substantially vertical axis, the carousel having a plurality of shelves each divided into compartments. Each compartment contains a food product such as a snack or light meal. In use, the carousel is rotated until the desired product is aligned with an access door, and the door unlocked by a payment mechanism receiving, for example, coins, tokens or a smart card.

The prior art vertical carousel arrangements suffers a number of disadvantages. In particular, food is poorly displayed with only a forward portion of the carousel being visible to the user. Only one customer may operate the vending machine at any one time, to rotate the carousel and view the products on offer. Food products on in particular the uppermost and lowermost shelves of the carousel are difficult to view for most users from a normal standing position, leading to poor sales of products in these areas.

The prior art vending machines are technically complex, having relatively high manufacturing costs and poor reliability. Further, the machines are bulky, often being difficult to fit through a normal doorway, and are therefore awkward to transport and install.

GB-A-2104050 (Ahlstrom) discloses a vending machine having a plurality of drums arranged to rotate about a generally horizontal axis, wherein the drums are provided with radially extending partitions to form a plurality of compartments about a circumference of each drum. The compartments each receive a vendable product, suitably frozen goods such as ice cream. However, the arrangement of this prior art document is mechanically complex and is only suitable for a narrow range of products being of a relatively robust nature. Also, this horizontally arranged prior art example suffers similar problems to the typical vertical carousel arrangement discussed above, namely that only a minor proportion of the products can be viewed at any one position of the carousel or drum.

SUMMARY OF THE INVENTION

It is an aim of the present invention to provide a vending machine which displays vendable items such that a majority of the items are simultaneously viewable by the consumer. It is an aim of at least preferred embodiments of the present invention to provide a vending machine which overcomes at least some of the problems associated with prior art vending machines.

In one aspect the present invention provides a vending machine comprising: a display arrangement for displaying vendable items, said display arrangement having a plurality of display shelves; drive means for driving said display arrangement to rotate about an axis of rotation arranged substantially horizontally; and release means for releasing a vendable item from said display arrangement for vending to a user; wherein each of said display shelves is operatively maintainable in a substantially horizontal plane during said rotation of said display arrangement.

Preferably, each shelf is pivotably mounted to a support member, ideally at either end thereof. Preferably the support member is substantially circular with the shelves preferably being spaced about the circumference of the support, preferably equally spaced. Preferably the end of the shelves are each moved in a substantially circular path lying in a plane normal to said horizontal axis of rotation, and preferably each shelf is maintained in a substantially horizontal plane throughout said circular path.

The shelves and supports together form a wheel assembly which operates on the principle of a ferris wheel to rotate the shelves about an axis of rotation whilst keeping the shelves horizontal from the display of food products. Preferably, the wheel assembly is mounted on a base in order to present the food product displayed on the shelves at a convenient height for selection by the user. The base preferably houses a refrigeration unit for directing cool air at the wheel assembly to thus maintain the food product at a desired temperature range. preferably, the wheel assembly is covered by a lid coupled to said base. Ideally, the lid is transparent over most or all of its surface area. Preferably, an access door is provided, preferably in said lid, to allow a user access to a food product displayed on one of the shelves.

The vending machine suitably comprises drive means for driving rotation of said display arrangement, preferably in a stepwise manner with each shelf being aligned in sequence with said access door. Preferably, said drive means drives said rotation in response to a user selection input. The drive means may drive the rotation uni-directionally or bi-directionally.

Preferably, the wheel assembly is readily releasably coupled to said base. Preferably, the number of shelves provided in said wheel assembly may be altered according to the food product to be displayed, preferably with twelve, sixteen or thirty-two shelves being provided. Preferably, the shelves are releasably mounted to the supports such that the number of shelves on each support may be changed.

Preferably, said vending machine comprises payment means such as a coin or token mechanism or a smart card reader for accepting user payment for the food products displayed. Once payment has been accepted, the access door is released, or preferably driven open, such that a food product aligned with the access door may be retrieved by the user. Preferably, the access door comprises guard means for inhibiting access to any shelf other than that aligned with said access door. Alternatively, said guard means may be provided on each shelf.

Preferably, two or more said wheel assemblies are provided on said base, with each wheel assembly being independently driven and having an independent user selection control and payments means. Preferably, four or six or more said wheel assemblies are provided.

Preferably, said base is provided with a shelf projecting substantially horizontal from one or more sides of the base, and preferably the shelf is configured as a tray slide.

The vending machine disclosed herein has a number of advantages. In particular, the vendable items such as food products are displayed on a substantially horizontal plane beneath a transparent lid and are clearly visible to the user. The vendable items are presented at a readily accessible and visible height. Further, all of the items are visible at once, reducing the time taken for each user to select their desired product or products, and thereby increasing throughput.

Where the lid and the or each wheel assembly is readily removable from the base, the vending machine is easily disassembled and transported even through narrow door openings. Further, the vending machine is easily cleaned, and wheel assemblies are readily interchanged according to the needs of the food product to be displayed or for maintenance or repair.

These and other objects, features and advantages of the invention will become clear from the following description of the preferred embodiments when read in conjunction with the accompanying drawings.

DESCRIPTION OF THE PREFERRED EMBODIMENTS

Figure 1:
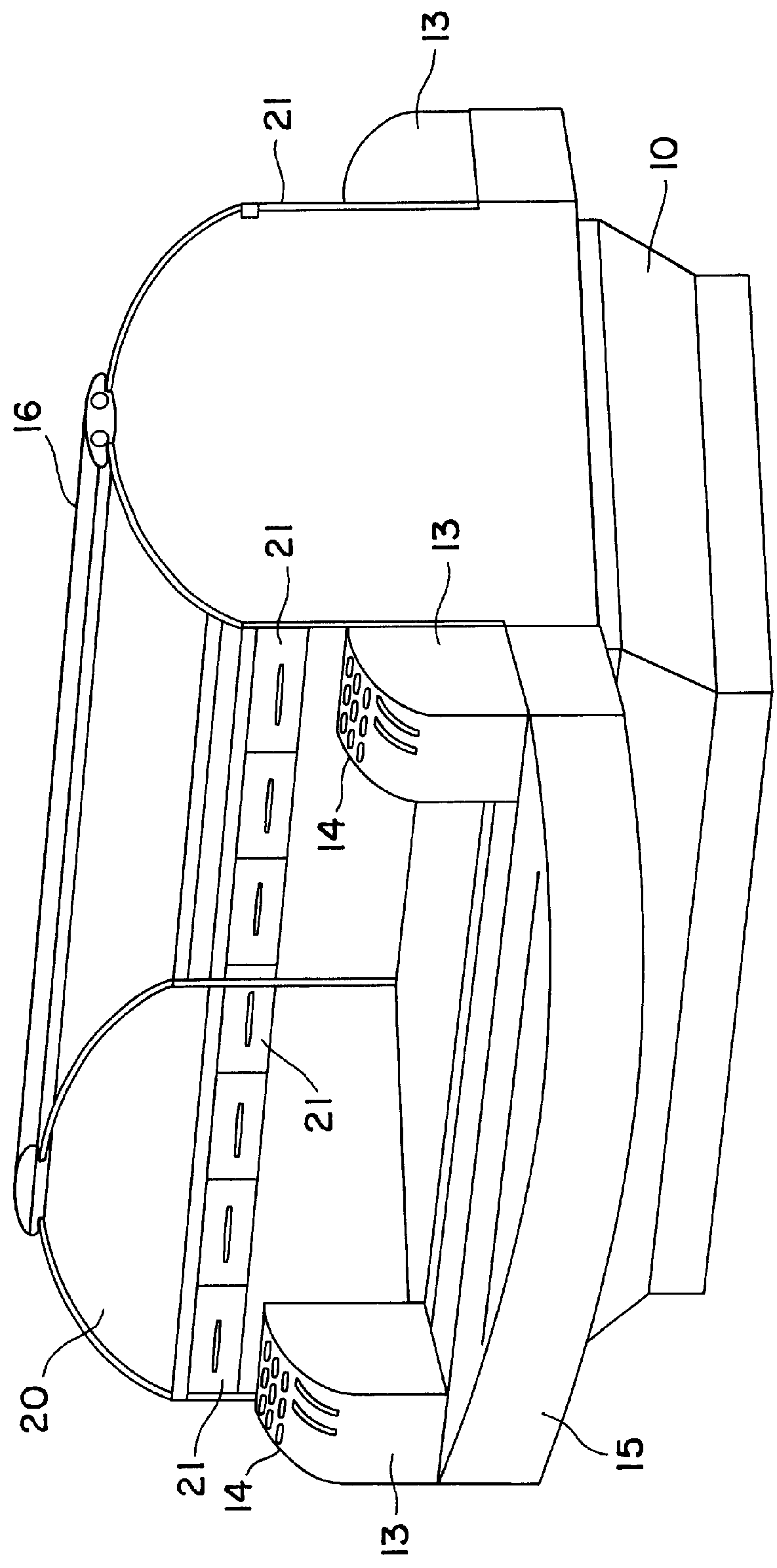
FIG. 1 is a perspective view of a first embodiment of the vending machine.
Figure 2:
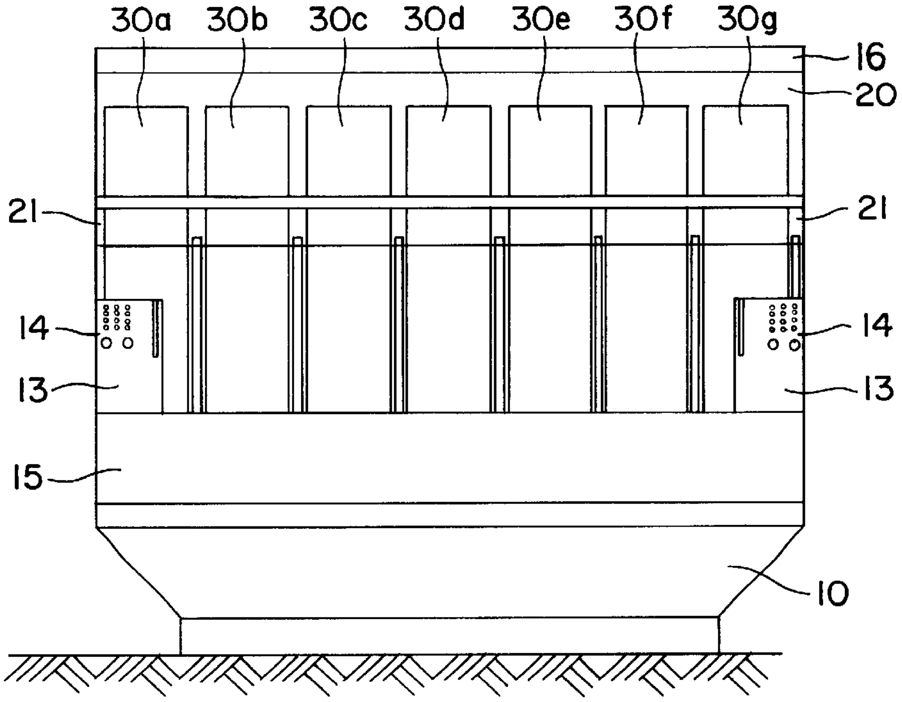
FIG. 2 is a front view of the vending machine of FIG. 1.
Figure 3:
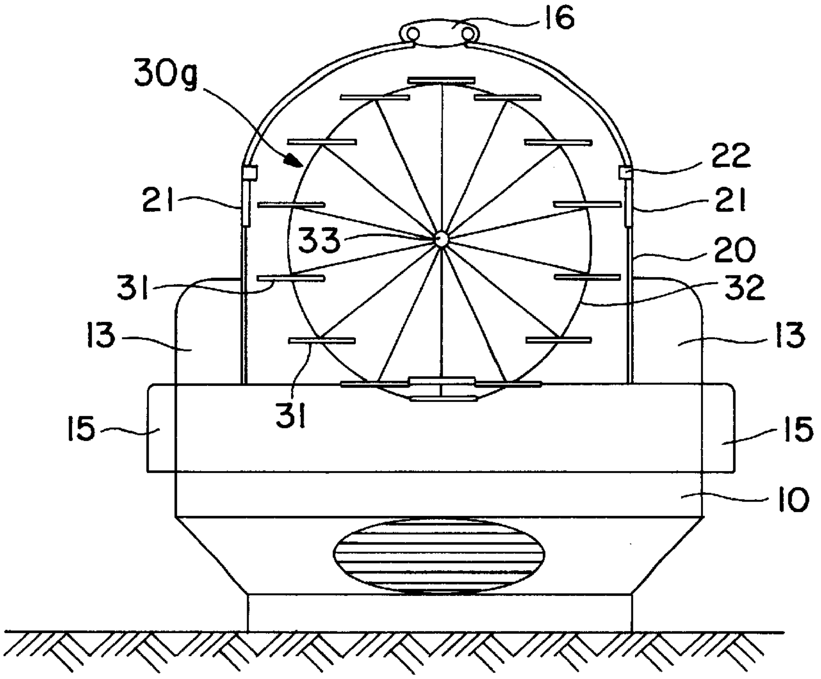
FIG. 3 is a sectional side view of the vending machine of FIG. 2.

Referring to FIGS. 1, 2 and 3, a first preferred embodiment of the vending machine comprises a base 10 coupled to a transparent lid 20. The lid 20 is coupled to the base 10 by any suitable arrangement, including a readily releasable coupling such as catches or the like. The lid 20 defines a display area and is provided with a plurality of access doors 21 at a convenient height for a user. Although FIG. 1 shows the access doors 21 provided in the lid 20, any suitable location may be used, including on the base 10.

The base 10 conveniently houses a refrigeration unit for directing cool air into the lid 20 to keep the display area within an appropriate temperature range. The lid 20 is suitably hemi-spherical in cross section, or may have planar face portions. The lid 20 is suitably constructed from double glazed transparent material such as glass and/or plastics material.

Payment means 13 of a type appropriate for receiving coins, tokens or other payment are located at convenient points around the base 10. In FIG, 1, four payment means 13 are located each at one of the four corners of the base 10. A user selection control means 14 is conveniently located on the base 10 at or adjacent each payment means 13. A tray slide 15 is conveniently provided running along either side of the base 10, and a lighting unit 16 is suitably provided along the lid 20 to illuminate the display area.

Referring now to FIGS. 2 and 3, mounted on the base 10 and within the lid 20 are a plurality of display wheels 30_a–g_ (shown schematically in FIG. 2 and in more detail in FIG. 3). The wheels 30_a–g_ are arranged to be rotated about a horizontal axis such that each of a plurality of display shelves 31 (shown in FIG. 3) may be sequentially aligned with a product release arrangement such as the access door 21.

Referring to FIG. 3, a wheel assembly 30_g_ is shown schematically in a side view of the vending machine. The wheel assembly 30_g_ comprises a pair of substantially circular supports 32 having a plurality of shelves 31 mounted therebetween. The supports 32 are conveniently spoked wheels, in this example having fourteen spokes. The spokes lead to a circumferential mounting means for pivotably mounting the shelves 31. Each shelf 31 is suitable for displaying a vendable item such as a food product ideally in a standard packaging arrangement or carrying tray. Each shelf is conveniently dimensioned to accept food product packaging of a standard size, such as of the order of 225×190×70 mm. At the centre of the wheel 32, ie. at the hub 33, the wheel is rotatably mounted to support and drive means (not shown).

In use, the user controls 14 may be associated with the wheel assemblies 30_a–g_, or may be used to selectively control any one of the wheel assemblies 30_a–g_. Each wheel is independently drive to rotate uni-directionally or bi-directionally until the display shelf having a desired vendable item such as a food product is aligned with the access door 21.

In one embodiment of the vending machine (not shown), the base 10 is provided with a longitudinal channel for receiving a drive arm mounted so as to project perpendicular to said base 10. The drive arm is provided with an electric powered motor coupled to a drive mechanism for receiving said hub 33 of said display wheel 30_g_. In response to control signals given by the user through the controls 14, the motor is powered to drive the drive arrangement and rotate the wheel. Suitably, the hub 33 of each display wheel assembly is readily releasably coupled to the drive arrangement.

A preferred embodiment of the wheel assembly and drive arrangement will not be described in more detail with reference to FIG. 4, which is a sectional plan view through one of the wheel assemblies 30_a–g_.

Figure 4:
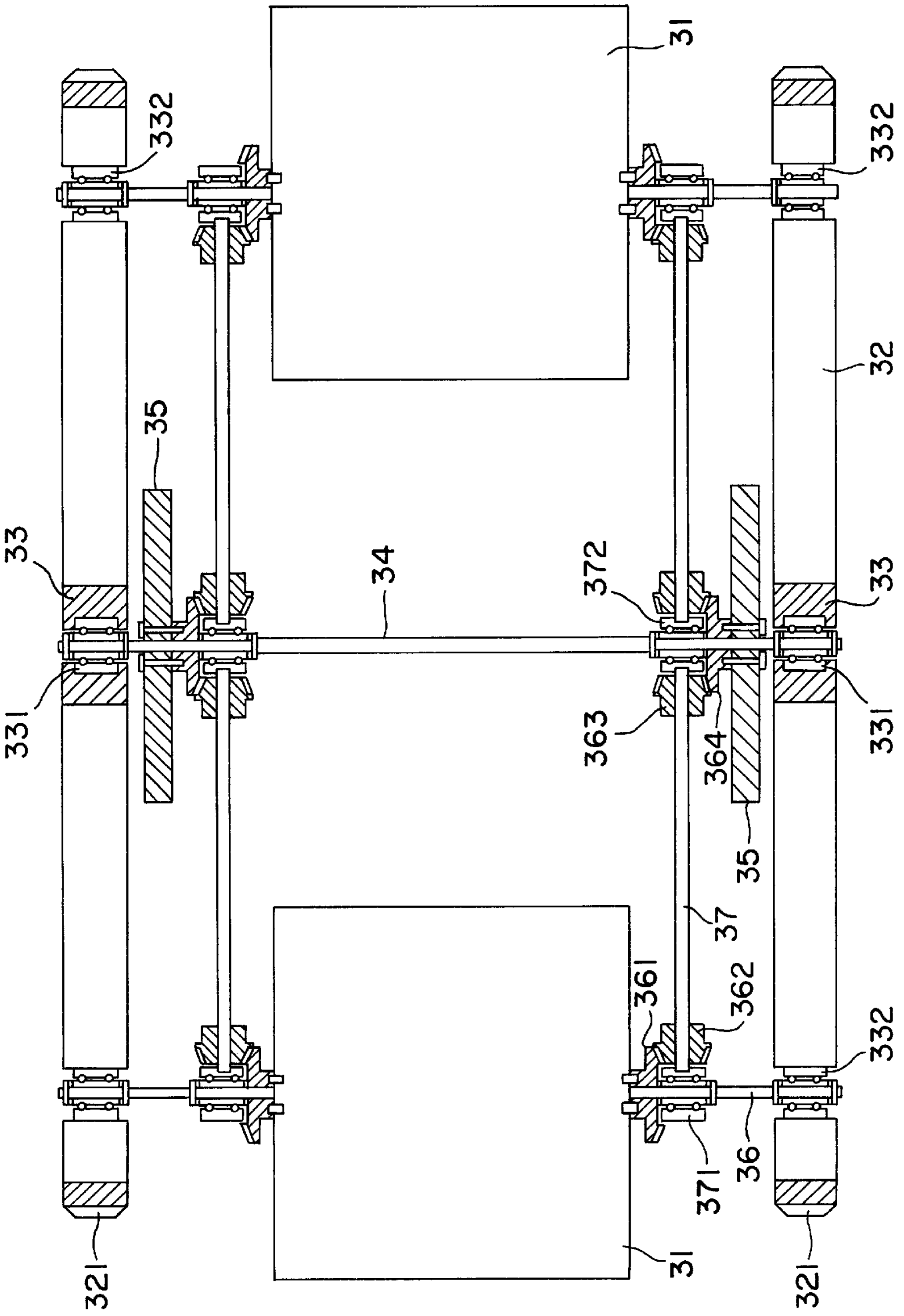
FIG. 4 is a plan view showing a wheel assembly.

FIG. 4 shows a partial cross sectional view to reveal a pair of circular supports in the form of spoked wheels 32 having a generally parallel spaced apart arrangement. At the centre of each of the spoked wheels 32 is a hub 33 rotatably mounted using bearings 331 to a common shaft 34. The shaft 34 is supported on stays 35 suitably projecting substantially vertically from the base 10 to support the spoked wheels 32 at a predetermined height above the base 10. At least one of the pair of spoked wheels 32 is coupleable to a drive arrangement. In the example embodiment shown in FIG. 4, each wheel 32 is provided with a plurality of drive teeth around an outwardly facing perimeter thereof. The drive teeth 321 engage with a drive cog suitably arranged on the base 10 to be driven such as by an electric motor. Further gearing may be provided between the motor and the final drive such as the drive teeth 321 in order to smoothly rotate the spoked wheels 32 at a desired speed.

Located between the spoked wheels 32 are a plurality of display shelves 31. For clarity, only two of the display shelves are shown in FIG. 4. Each of the display shelves 31 is pivotably mounted between the spoked wheels 32 such as by means of bearings 332.

In one embodiment (not shown) the display shelves 31 are suspended from the support wheels 32 and maintained in substantially horizontal position by gravity. However, such an arrangement tends to increase the overall size of the wheel assembly and in particular to increase the height of the centre of rotation, i.e. the height of shaft 34, in order to ensure that the lowermost display shelf still clears the surface of the base. However, the example embodiment of FIG. 4 is provided with a position drive means for maintaining each display shelf 31 in a substantially horizontal position throughout rotation of the display wheel assembly.

In the preferred embodiment shown in FIG. 4, each display shelf 31 is mounted to a transverse support member such as a shaft 36, and each display shelf 31 is provided with its own position drive means. In the example embodiment of FIG. 4 the position drive means comprises a pair of bevel gears 361, 362 at the display shelf 31, and a second pair of bevel gears 363, 364 at the wheel assembly support arrangement, in this case comprising the fixed shaft 34 and the stays 35.

The first bevel gear 361 is maintained in a fixed relationship with respect to the major plane of the display shelf 31 and is suitably co-axial with the shelf support shaft 36. The second bevel gear 362 of this first pair is arranged perpendicular to the first bevel gear and meshes therewith. The second bevel gear 362 is coupled to a coupling shaft 37 suitably rotatably supported on the shelf support shaft 36 by a bearing 371 and arranged perpendicular to the shelf support shaft 36. The third bevel gear 363 is provided at the opposite end of the coupling shaft 37 rotatably supported by a second bearing 372 perpendicular to the fourth bevel gear 364. The fourth bevel gear 364 is fixedly located with respect to the stay 35.

In use, one or both of the spoked wheels 32 is driven by the drive arrangement described about to rotate about the fixed shaft 34 supported by bearings 331. The position drive means comprising the first and second pairs of bevel gears 361, 362 and 363, 364 rotates each shelf support shaft 36 with respect to the spoked wheels 32, thereby maintaining each display shelf 31 in a fixed plane, ideally a horizontal fixed plane.

In the example embodiment of FIG. 4, each display shelf 31 is provided with a corresponding pair of position drive arrangements as described above, one on either side of the display shelf. However, in an alternative embodiment (not shown) only one of these position drive means is provided. Further, although the example embodiment of FIG. 4 has been described using bevel gears other arrangements will occur to the skilled person, such as the use of drive belts.

The display wheel assembly and drive means therefor described with reference to FIG. 4 has a number of advantages. The position drive means stably maintains the position of each display shelf 31 and copes with a variety of loading configurations. The display wheel is compact and requires less space than a suspension arrangement. Further, the position drive arrangement inhibits movement of any display shelf 31, which inhibits an unauthorized access by a user to adjacent shelves 31 within the display arrangement.

Referring again to FIG. 4, the lower end of each stay 35 is ideally readily releasably coupled to the base 10. Suitably, the lower end of each stay 35 engages one of a plurality of slots provided in the surface of the base 10, although any suitable arrangement may be used. Therefore, the or each wheel assembly is readily removed from the base 10 for maintenance or repair, and a replacement wheel inserted. The coupling arrangement ideally allows the stays 35 to be placed at one of a plurality of different spacings, allowing different width display wheels to be provided on the same base 10. The number, size and position of the wheels is also readily changed.

Figure 5:
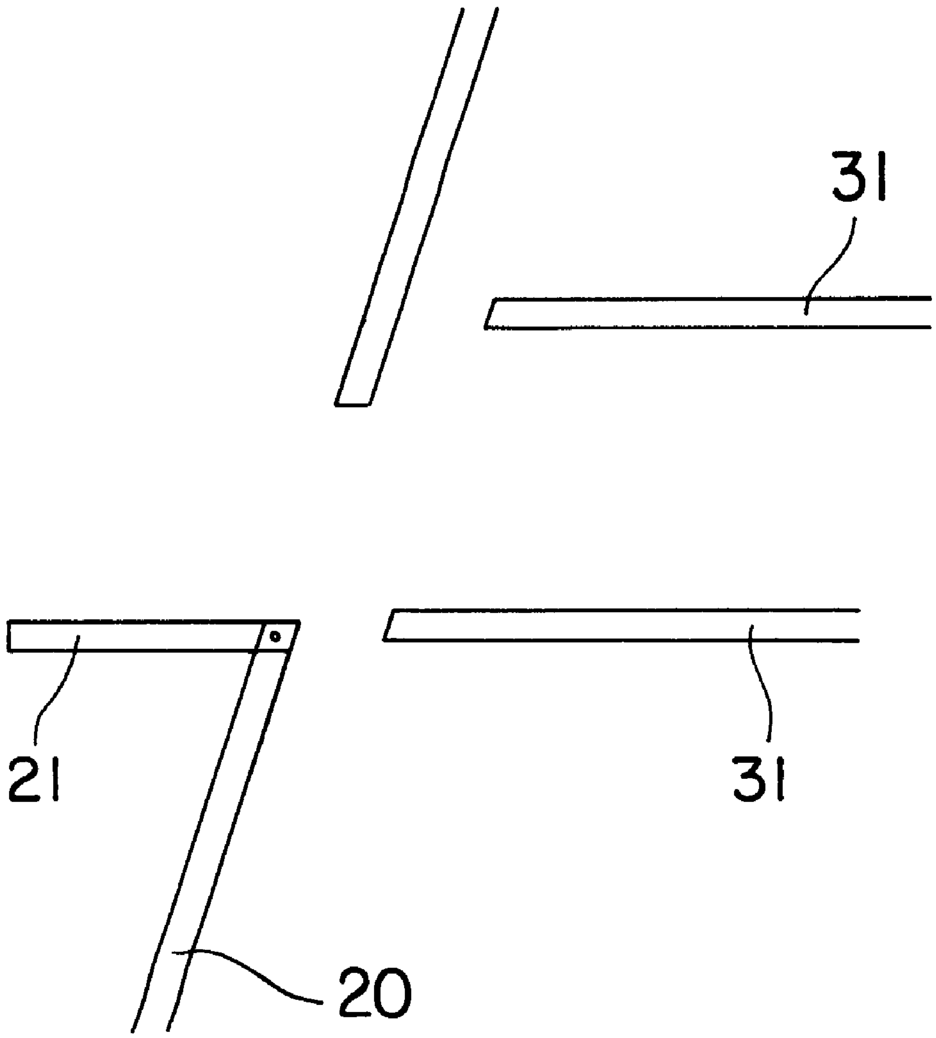
FIG. 5 is a said view of a door assembly.

Referring now to FIG. 5, an expanded view of the preferred access door arrangement 21 is shown together with the display shelves 31 adjacent thereto. Conveniently, the door 21 is hinged at a lower edge thereof and when open forms a platform such that a food product of the shelf 31 may be slid across the open door 21. Alternatively, the door 21 is conveniently hinged at an upper edge thereof. Each access door 21 is suitably supported by a longitudinal bar 22 running across the face of the transparent lid 20. Conveniently, the bar 22 supports an automatic drive arrangement for opening each of the access doors 21, and/or a release mechanism for retaining the access door 21 in a closed position. When a payment operation is completed such as using the payment means 13, the release mechanism operates to release movement of the access door 21 allowing the user to open the access door manually or allowing the access door 21 to be driven open. The shelf 31 is suitably aligned with the door 21 to inhibit access to any lower shelf, and the size of the opening in the lid 20 for the access door 21 inhibits access to any upper shelf. Additionally or alternatively a guard arrangement may be provided to inhibit user access to any shelf other than the shelf 31 aligned with the access door 21, and/or access to any neighbouring display wheel 30*a*–30*g*. Further, rotation of the or each wheel 30*a–g* may be inhibited whilst the access door is open.

Although the preferred embodiment has been illustrated having seven display wheel assemblies, alternate embodiments of the invention are provided with four, six, eight or eleven wheel assemblies and any suitable number may be provided. Also, the display wheel assemblies are conveniently mounted side by side but other orientations and locations may be used.

Advantageously, multiple users may access the vending machine simultaneously, significantly improving throughput. Further, other users may gather around the vending machine and view the products on display so as to be ready to immediately make their own selections, thus further improving throughput. The vendable products on the shelves are displayed at a convenient height, with all of the products on each display wheel being visible simultaneously. Further, where the lid is transparent over most of its surface area, rotation of each display wheel ensures that all of the vendable products pass a viewing point convenient for each user regardless of the user's height.

Although specific embodiments of the present invention have been disclosed and described in detail above, it will be understood by those skilled in the art that changes can be made without departing from the spirit and scope of the invention.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A vending machine comprising:

a display arrangement for displaying vendable items, said display arrangement having a plurality of display shelves;

drive means for driving said display arrangement to rotate about an axis of rotation arranged substantially horizontally; and release means for releasing a vendable item from said display arrangement for vending to a user by providing to said user access to only one display shelf of said plurality of display shelves;

wherein each of said display shelves is operatively maintainable in a substantially horizontal plane during said rotation of said display arrangement.

2. A vending machine as claimed in claim 1, wherein said display arrangement is rotatable in use in a substantially circular path around said axis of rotation.

3. A vending machine as claimed in claim 2, wherein said display arrangement comprises a support member, said support member having said plurality of display shelves pivotably mounted thereon.

4. A vending machine as claimed in claim 3, wherein said support member comprises a substantially circular portion for receiving said display shelves spaced about a circumference thereof.

5. A vending machine as claimed in claim 4, wherein said display shelves are equally spaced around the circumference of the support member.

6. A vending machine comprising:

a display arrangement for displaying vendable items, said display arrangement having a plurality of display shelves;

drive means for driving said display arrangement to rotate about an axis of rotation arranged substantially horizontally; and release means for releasing a vendable item from said display arrangement for vending to a user;

wherein each of said display shelves is operatively maintainable in a substantially horizontal plane during said rotation of said display arrangement, wherein said display arrangement is rotatable in use in a substantially circular path around said axis of rotation, wherein said display arrangement comprises a support member, said support member having said plurality of display shelves pivotably mounted thereon, wherein said support member comprises a substantially circular portion for receiving said display shelves spaced about a circumference thereof, wherein said display shelves are equally spaced around the circumference of the support member, and wherein said display arrangement comprises two of said support members, each support member having one end of each of said display shelves pivotably mounted thereon.

7. A vending machine as claimed in claim 6, wherein said shelves and said support member or members together form a wheel assembly.

8. A vending machine as claimed in claim 7, further comprising a base having said wheel assembly mountable thereon.

9. A vending machine as claimed in claim 8, wherein said base is coupleable to a lid arranged to cover said wheel assembly.

10. A vending machine as claimed in claim 9, wherein said base comprises a refrigeration unit arranged to direct cool air at said wheel assembly.

11. A vending machine as claimed in claim 9, wherein said release means comprises an access door allowing access, when open, to one of said plurality of display shelves, or a selected portion of one of said display shelves.

12. A vending machine as claimed in claim 11, wherein said access door is releasable for opening in response to operation of a payment mechanism.

13. A vending machine as claimed in claim 11, wherein said drive means is arranged for driving rotation of said display arrangement in a step wise manner such that in use each of said display shelves is aligned in sequence with said access door.

14. A vending machine as claimed in claim 8, wherein said wheel assembly is readily releasably mountable with respect to said base.

15. A vending machine as claimed in claim 8, comprising two or more of said wheel assemblies arranged to rotate about a common axis.

16. A vending machine as claimed in claim 14, wherein said each wheel assembly is independently driven by said drive means.

* * * * *